(12) United States Patent
Versaevel et al.

(10) Patent No.: US 11,220,346 B2
(45) Date of Patent: Jan. 11, 2022

(54) ACOUSTIC ATTENUATION PANEL FOR AN AIRCRAFT PROPULSION UNIT AND PROPULSION UNIT INCLUDING SUCH A PANEL

(71) Applicants: Safran Nacelles, Gonfreville L'Orcher (FR); Safran Aircraft Engines, Paris (FR)

(72) Inventors: Marc Versaevel, Gonfreville L'Orcher (FR); Denis Ramage, Gonfreville L'Orcher (FR); Baptiste Cordier, Gonfreville L'Orcher (FR); Georges Riou, Moissy Cramayel (FR); Jacky Mardjono, Moissy Cramayel (FR)

(73) Assignees: Safran Nacelles, Gonfreville L'Orcher (FR); Safran Aircraft Engines, Paris (FR)

( * ) Notice: Subject to any disclaimer, the term of this patent is extended or adjusted under 35 U.S.C. 154(b) by 471 days.

(21) Appl. No.: 16/260,972

(22) Filed: Jan. 29, 2019

(65) Prior Publication Data
US 2019/0161200 A1    May 30, 2019

Related U.S. Application Data

(63) Continuation of application No. PCT/FR2017/052116, filed on Jul. 27, 2017.

(30) Foreign Application Priority Data

Jul. 29, 2016 (FR) ..................................... 16/57412

(51) Int. Cl.
*B64D 33/02* (2006.01)
*F02K 1/82* (2006.01)
(Continued)

(52) U.S. Cl.
CPC ............. *B64D 33/02* (2013.01); *B64D 29/00* (2013.01); *B64D 33/06* (2013.01); *F02C 7/045* (2013.01);
(Continued)

(58) Field of Classification Search
CPC ........ B64D 33/02; B64D 33/06; B64D 29/00; B64D 2033/0206; B64D 2033/0286;
(Continued)

(56) References Cited

U.S. PATENT DOCUMENTS 4,091,892 A * 5/1978 Hehmann ............... F02K 1/827
181/286
4,137,992 A * 2/1979 Herman .................. F02K 1/827
181/213
(Continued)

FOREIGN PATENT DOCUMENTS

EP    0824066    2/1998
FR    2811129    1/2002
(Continued)

OTHER PUBLICATIONS

International Search Report for international application PCT/FR2017/052116, dated Nov. 23, 2017.

*Primary Examiner* — Forrest M Phillips
(74) *Attorney, Agent, or Firm* — Burris Law, PLLC

(57) ABSTRACT

An acoustic attenuation panel for a propulsion unit including a nacelle and a turbojet engine includes a cellular core disposed between an inner skin and an outer skin, called acoustic skin, the acoustic skin including a plurality of acoustic apertures, the acoustic apertures being inclined, at a non-zero inclination angle (β) relative to the direction normal to the acoustic skin, upstream with respect to the flow direction of the air or gas flow to which the panel is intended to be subjected under normal operating conditions,
(Continued)

that is to say upstream of the propulsion unit when the panel is mounted in such a unit.

11 Claims, 4 Drawing Sheets

(51) Int. Cl.
| | |
|---|---|
| *F02C 7/045* | (2006.01) |
| *G10K 11/172* | (2006.01) |
| *F02K 1/34* | (2006.01) |
| *B64D 29/00* | (2006.01) |
| *F02C 7/24* | (2006.01) |
| *G10K 11/16* | (2006.01) |
| *G10K 11/168* | (2006.01) |

(52) U.S. Cl.
CPC ............... *F02C 7/24* (2013.01); *F02K 1/827* (2013.01); *G10K 11/172* (2013.01); *B64D 2033/0206* (2013.01); *B64D 2033/0286* (2013.01); *F05D 2240/14* (2013.01); *F05D 2250/283* (2013.01); *F05D 2260/96* (2013.01); *F05D 2260/963* (2013.01); *F05D 2300/603* (2013.01); *G10K 11/161* (2013.01); *G10K 11/168* (2013.01); *Y02T 50/60* (2013.01)

(58) Field of Classification Search
CPC . F02C 7/045; F02C 7/24; F02K 1/827; G10K 11/172; G10K 11/168; G10K 11/161; Y02T 50/60; F05D 2240/14; F05D 2250/283; F05D 2260/96; F05D 2260/963; F05D 2300/603
USPC .......................................................... 181/290
See application file for complete search history.

(56) References Cited

U.S. PATENT DOCUMENTS

| | | | | |
|---|---|---|---|---|
| 4,537,277 | A * | 8/1985 | Bryce | F02K 1/34 181/214 |
| 6,122,892 | A * | 9/2000 | Gonidec | F02K 1/822 52/793.1 |
| 6,439,340 | B1 * | 8/2002 | Shirvan | F02C 7/045 181/213 |
| 7,267,297 | B2 * | 9/2007 | Campbell | F02K 1/827 244/1 N |
| 7,963,362 | B2 * | 6/2011 | Lidoine | F02C 7/24 181/214 |
| 11,047,254 | B2 * | 6/2021 | Leyko | F02K 3/075 |
| 2003/0141144 | A1 * | 7/2003 | Wilson | B23K 26/0006 181/292 |
| 2006/0169532 | A1 * | 8/2006 | Patrick | F02C 7/045 181/210 |
| 2006/0169533 | A1 * | 8/2006 | Patrick | F02C 7/045 181/210 |
| 2009/0277714 | A1 * | 11/2009 | Putnam | F02K 1/827 181/213 |
| 2010/0206664 | A1 | 8/2010 | Bagnall | |

FOREIGN PATENT DOCUMENTS

| | | | | |
|---|---|---|---|---|
| FR | 2962586 | | 1/2012 | |
| GB | 2391059 | A * | 1/2004 | ............... B32B 3/20 |

* cited by examiner

ACOUSTIC ATTENUATION PANEL FOR AN AIRCRAFT PROPULSION UNIT AND PROPULSION UNIT INCLUDING SUCH A PANEL

CROSS-REFERENCE TO RELATED APPLICATIONS

This application is a continuation of International Application No. PCT/FR2017/052116, filed on Jul. 27, 2017, which claims priority to and the benefit of FR 16/57412 filed on Jul. 29, 2016. The disclosures of the above applications are incorporated herein by reference.

FIELD

The present disclosure relates to the field of acoustic attenuation in nacelles and in aircraft turbojet engines, and more generally in aircraft propulsion units.

BACKGROUND

The statements in this section merely provide background information related to the present disclosure and may not constitute prior art.

The sound emissions generated by the turbojet engines of an aircraft are particularly intense at the time of take-off, when the aircraft is generally close to inhabited zones.

Numerous research on how to reduce sound emissions generated by aircraft turbojet engines have been conducted in recent years.

In particular, this research has led to the setup of acoustic attenuation panels in the nacelle surrounding the turbojet engine as well as in certain portions (such as the fan casing) of the turbojet engine itself, in particular in the areas where the sound emissions are the highest.

These panels generally operate according to the principle of Helmholtz resonators, and comprise for this end a set of cavities sandwiched between a solid skin on the one hand, and a perforated skin on the other hand.

The perforated skin is oriented towards the noise emitting area, such that the acoustic waves can penetrate through the apertures of the perforated skin within the cavities. The acoustic energy is dissipated by visco-thermal effect in the holes of the perforated skin. The height of cavities allows selecting the target frequency band.

In addition to their acoustic attenuation function, these panels ensure two other functions:
- an aerodynamic function: the perforated skin being in contact with the flows of air and gas circulating through the turbojet engine and the nacelle, the perforated skin channels the flow and must disturb the least possible these flows; and
- a force take-up function: via the sandwich, the acoustic attenuation panel is able to take-up some of the forces exerted on the nacelle.

The perforated skin of an acoustic attenuation panel is generally obtained by drilling an initially solid skin, by means of drills, the drilling being performed according to a direction substantially perpendicular to the skin. The drilling pattern (distance between the holes, diameter of the holes) is optimized so that the perforated skin has the desired acoustic resistance (for example, an acoustic resistance close to that of the air upstream of the fan of the turbojet engine, and an acoustic resistance in the range of two to three times the acoustic resistance of the air downstream of the fan) in the presence of a grazing flow. A perforated skin is thus generally characterized by its percentage of open area (commonly referred to as "POA," for "percentage of open area"). This percentage, expressed in percent, is representative of the area occupied by the acoustic apertures divided by the total area of the acoustic skin. For a given drilling diameter, the higher this percentage is, the greater is the number of drillings.

However, drilling operations are complex and expensive, and there is a strong interest in limiting the importance of these operations, in particular by reducing as much as possible the percentage of open area. Indeed, a percentage of open area of 14% can represent nearly 55.000 holes per m², and it is therefore understandable that reducing this percentage has great advantages in terms of time and cost of manufacture.

SUMMARY

The present disclosure provides an acoustic attenuation panel for a propulsion unit including a nacelle and a turbojet engine, the panel including a cellular core disposed between an inner skin and an outer skin, called acoustic skin, the acoustic skin including a plurality of acoustic apertures, the acoustic apertures being inclined at a non-zero inclination angle relative to the direction normal to the acoustic skin, upstream with respect to the flow direction of the air or gas flow to which the panel is intended to be subjected under normal operating conditions, that is to say upstream of the propulsion unit when said panel is mounted in such a unit.

Thus, thanks to the inclination of the acoustic apertures upstream of the flow to which the acoustic attenuation panel is subjected in an operating propulsion unit, the acoustic resistance of the panel is substantially reduced. Thus, with equal acoustic resistance, it is possible to greatly reduce (for example by 30%) the percentage of open area.

In one form, the inclination angle, or drilling angle, of the acoustic apertures is comprised between 10° and 40°.

In one form, the inner and outer skins are made of organic matrix composite materials.

In one form, the acoustic apertures are made by mechanical drilling or by laser drilling.

The present disclosure also concerns an aircraft propulsion unit, said propulsion unit comprising at least one panel as defined above.

In one form, the propulsion unit includes a nacelle and an aircraft turbojet engine, the turbojet engine including in particular a fan.

In one form, the propulsion unit includes a plurality of acoustic attenuation panels including different drilling angles.

In one form, the drilling angle of the panels is decreasing from upstream to downstream of the nacelle when the panels are located upstream of the fan of the turbojet engine, the drilling angle of the panels being increasing when the panels are located downstream of the fan.

In one form, the turbojet engine includes a fan casing surrounding the fan, the inner surface of the fan casing including one or several acoustic attenuation panel(s) in accordance with the present disclosure.

In one form, the turbojet engine includes a straightener located downstream of the fan, the straightener including a plurality of blades, the outer surface of the straightener blades including one or several acoustic attenuation panel(s) in accordance with the present disclosure.

In one form, the turbojet engine includes, downstream of the fan, a casing delimiting the inner surface of a secondary flow path and the outer surface of a primary flow path, one or both of these surfaces including one or several acoustic attenuation panel(s) in accordance with the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
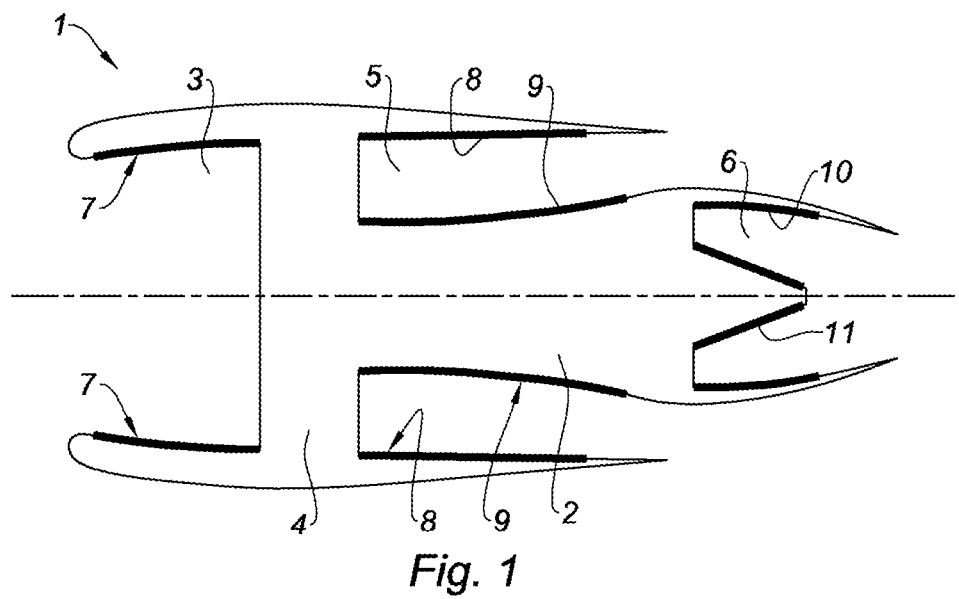
FIG. 1 is a schematic longitudinal sectional view of a propulsion unit including a nacelle surrounding an aircraft bypass turbojet engine according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, a conventional propulsion unit is schematically represented. This propulsion unit includes a conventional nacelle 1, equipping a bypass turbojet engine 2. The nacelle 1 includes an air inlet 3, located upstream of a fan 4 of the turbojet engine 2. Downstream of the fan 4, the nacelle defines a cold flow path, or secondary flow path 5, and a hot flow path, or primary flow path 6.

Conventionally, the air inlet 3 includes an acoustic attenuation lining 7, formed by the assembly of acoustic attenuation panels.

The cold flow path 5 is delimited by radially outer and inner walls, also at least partially lined with acoustic attenuation panels 8 and 9 respectively.

Finally, the hot flow path 6 is terminated by a primary nozzle and a gas ejection cone, at least partially lined with acoustic attenuation panels 10, 11.

The locations of the acoustic attenuation panels 7 to 11 correspond to the walls of the nacelle at the level of which the noise propagates. The presence of these acoustic attenuation panels thus allows substantially reducing the sound level emitted by the aircraft propulsion unit, in particular during take-off or landing.

Figure 2A:
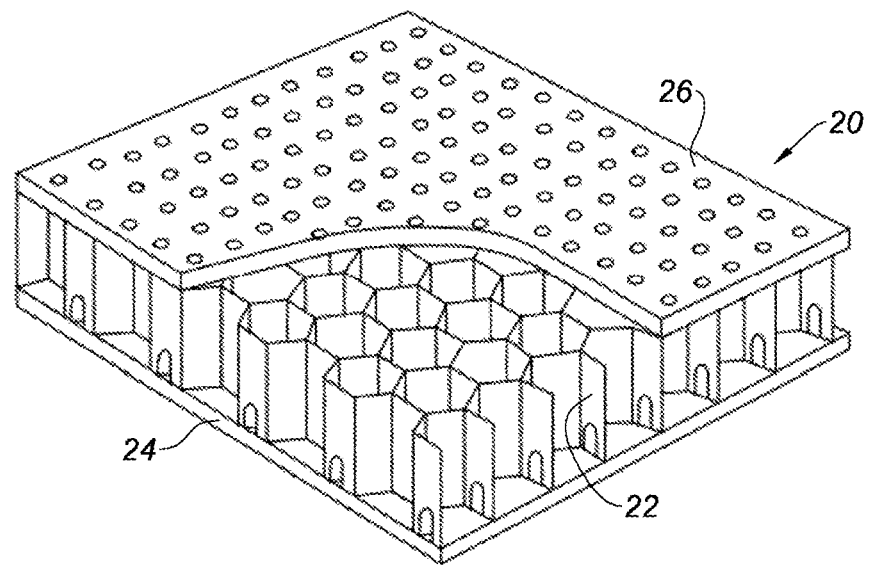
FIGS. 2a and 2b represent an acoustic attenuation panel according to the prior art.

FIG. 2a represents a conventional acoustic attenuation panel 20, including a cellular core 22 sandwiched between a solid skin 24, called support skin, and a perforated skin 26, called acoustic skin. The cellular core includes a plurality of cells, in the example with a hexagonal section (thus forming a structure called "honeycomb" structure). These cells form the acoustic cavities of the acoustic attenuation panel 20. The cellular core is generally metallic whereas the acoustic skin 26 and the support skin 24 are commonly made of a composite material, in particular based on carbon fibers.

Figure 2B:
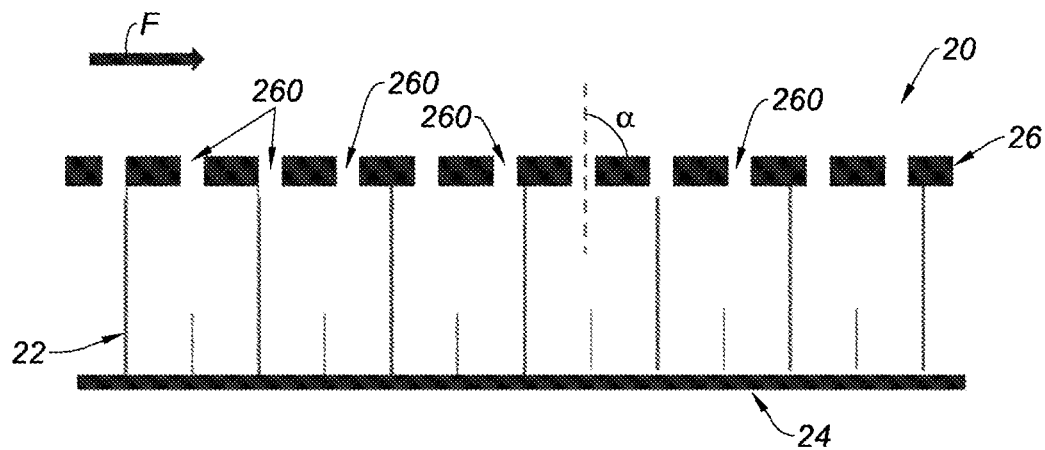

FIG. 2b schematically represents the acoustic attenuation panel 20 of FIG. 2a seen in cross-section. In FIG. 2b, the arrow F indicates the flow direction of the air (or gas) flow to which the panel is subjected under normal operating conditions, that is to say when it is integrated with a turbojet engine nacelle, and that the turbojet engine is in operation, in particular in flight. As mentioned above, the acoustic skin 26 includes a plurality of acoustic apertures 260, obtained by drilling the skin according to a direction substantially perpendicular thereto, and materialized by the angle α, whose value is 90°.

Figure 3:
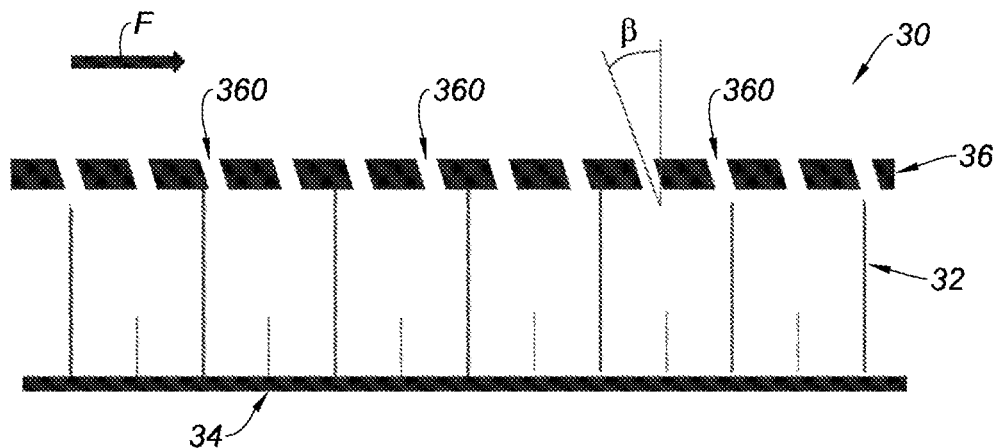
FIG. 3 represents an acoustic attenuation panel in accordance with the present disclosure.

FIG. 3 represents an acoustic attenuation panel 30 in accordance with the present disclosure. In FIG. 3, the arrow F also indicates the flow direction of the air flow to which the panel is subjected under normal operating conditions. In particular, the air flow is directed from upstream to downstream of the propulsion unit in which the panel is integrated. The panel 30 includes a solid support skin 34 and a perforated acoustic skin 36. A cellular core 32 is disposed between the support skin 34 and the acoustic skin 36. The acoustic skin 36 includes a plurality of acoustic apertures 360.

In accordance with the present disclosure, the acoustic apertures 360 are inclined upstream with respect to the flow direction of the air (or gas) flow materialized by the arrow F. In other words, the acoustic apertures 360 are inclined forward (or upstream) of the propulsion unit when the panel is integrated with such a unit. The acoustic apertures 360 are obtained by a drilling performed according to a direction oblique relative to the direction normal to the skin, materialized by the drilling angle β (or inclination angle). The value of the drilling/inclination angle β will advantageously be comprised between 10° and 40°. As mentioned above, the forward inclination of the acoustic apertures 360 has the effect of substantially reducing the acoustic resistance of the acoustic attenuation panel in the presence of a grazing flow, therefore when the propulsion unit with which the acoustic attenuation panel is integrated is in operation. Consequently, with equal acoustic resistance, it is possible to reduce the percentage of open area. As an example, an acoustic skin obliquely drilled with a drilling angle β of 20° and a percentage of open area of 9% (as in the example of FIG. 3) will have an acoustic behavior equivalent to an acoustic skin perpendicularly drilled (as in the example of FIGS. 2a and 2b) with a percentage of open area of 14%.

The reduction in the percentage of open area that the present disclosure authorizes therefore allows reducing the time and costs related to the drilling operations.

Figure 4:
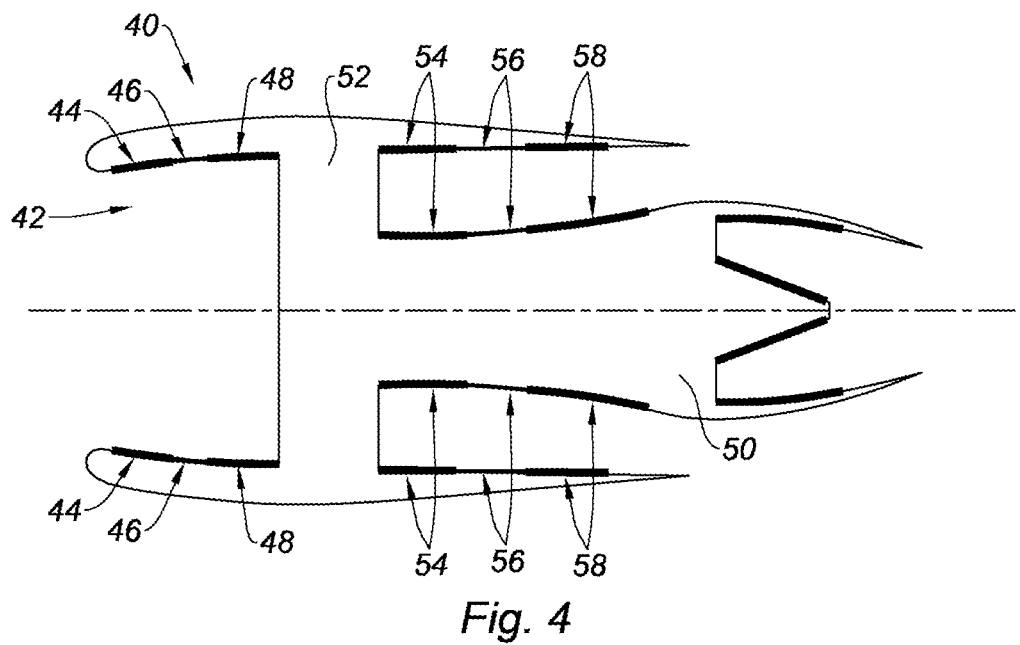
FIG. 4 represents a propulsion unit whose nacelle is equipped with acoustic attenuation panels in accordance with the present disclosure.

As shown in FIG. 4, it is furthermore possible to jointly use acoustic attenuation panels in accordance with the present disclosure, but having different drilling/inclination angle β values, and/or to provide, for a same acoustic attenuation panel, areas including apertures with different inclinations. FIG. 4 thus represents a propulsion unit including a turbojet engine 50 housed in a nacelle 40, whose air inlet 42 is provided with an acoustic lining. This lining comprises acoustic attenuation panels distributed, from upstream to downstream of the nacelle 40, in several areas (in the example three areas) having a different acoustic drilling angle β. A first area 44 includes acoustic attenuation panels having the largest drilling angle β of the lining, for example 20°. A second area 46, located downstream of the first area 44, includes acoustic attenuation panels having a drilling angle β smaller than for the first area 44, for example 10°. Finally, a third area 48, located downstream of the second area 46, includes acoustic attenuation panels having a drilling angle β smaller than for the second area, and in particular a zero drilling angle β. Thus, by decreasingly varying the angle from upstream to downstream, an acoustic treatment is performed whose acoustic resistance varies along the longitudinal axis of the propulsion unit, which makes the acoustic resistance more suited to the flow velocity and to the local sound level. Varying the drilling angle β allows obtaining, with a constant percentage of open area, an acoustic behavior similar to a conventional acoustic attenuation panel whose percentage of open area would be variable.

In the example described above, it will be noted that the areas 44, 46, 48 are located upstream of the fan 52 of the turbojet engine 50 housed in the nacelle 40. In this case, it will be provided that the drilling angle is decreasing from upstream to downstream of the nacelle. However, for areas located downstream of the fan 52, a reverse progression will be provided: the drilling angle will increase from upstream to downstream of the propulsion unit. FIG. 4 thus shows a second acoustic lining disposed downstream of the fan 52. A first area 54 includes acoustic attenuation panels having the smallest drilling angle of this second lining, and in particular a zero drilling angle. A second area 56, located downstream of the first area 54, includes acoustic attenuation panels having a drilling angle larger than for the first area 54, for example 10°. Finally, a third area 58, located downstream of the second area 56, includes acoustic attenuation panels having the largest drilling angle of the lining, for example a drilling angle of 20°.

Figure 5:
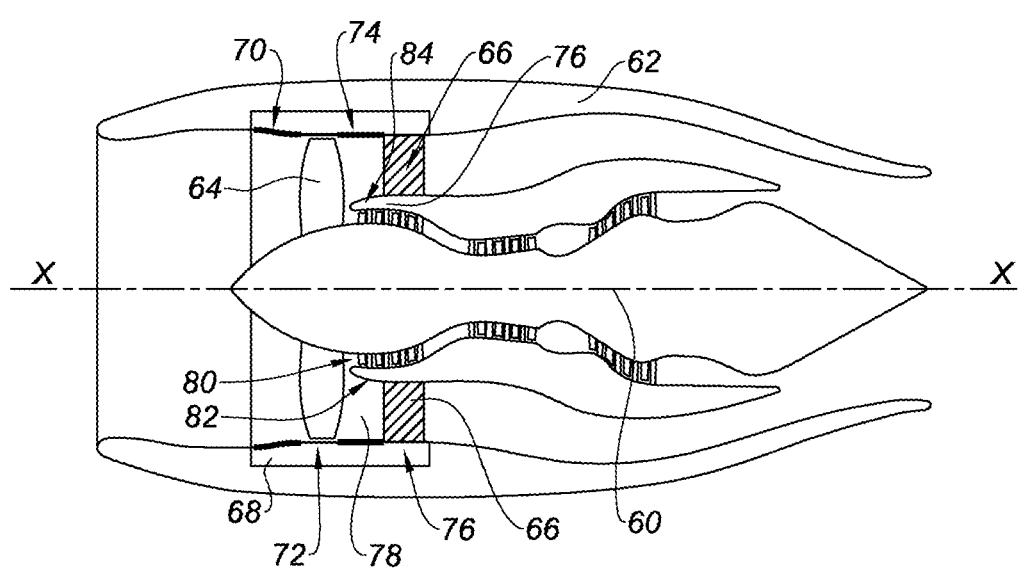
FIG. 5 represents a propulsion unit whose turbojet engine is equipped with acoustic attenuation panels in accordance with the present disclosure.

FIG. 5 shows an example of a propulsion unit including acoustic attenuation panels in accordance with the present disclosure disposed in certain portions of the turbojet engine. Thus, the propulsion unit of FIG. 5 includes a turbojet engine 60 with a longitudinal axis XX, housed in a nacelle 62. The turbojet engine 60 includes a fan 64 and, downstream thereof, a straightener including blades 66. The fan 64 and the straightener are surrounded by a fan casing 68. Acoustic attenuation panels in accordance with the present disclosure are disposed in particular on the inner surface of the fan casing 68, in the areas referenced 70, 72, 74, 76, these areas being located respectively downstream of the fan 64, facing the blades of the fan 64, between the fan 64 and the straightener, and facing the blades 66 of the straightener. The blades 66 of the straightener are also equipped with acoustic attenuation panels in accordance with the present disclosure. The turbojet engine 60 includes, downstream of the fan 64, a casing 76 delimiting the inner surface 82 of the secondary flow path 78 and the outer surface 84 of the primary flow path 80. At least one of the inner surface 82 of the secondary flow path 78 and the outer surface 84 of the primary flow path 80 also includes one or several acoustic attenuation panel(s) in accordance with the present disclosure.

Figure 6:
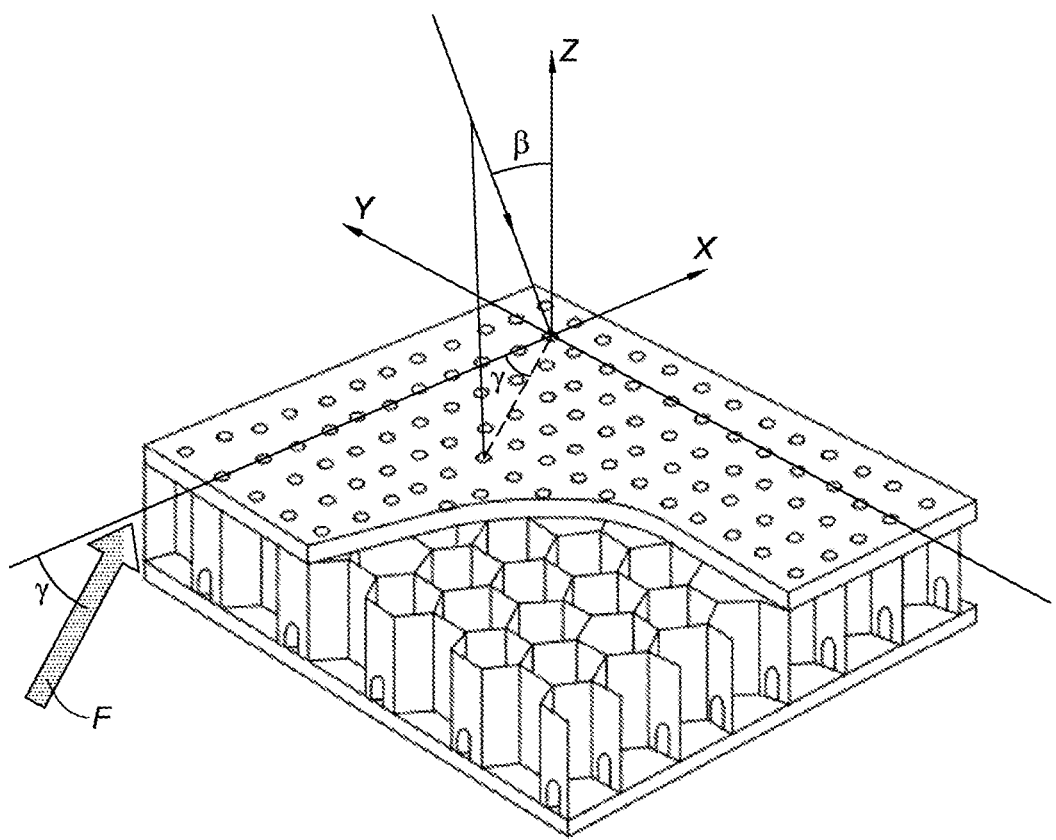
FIG. 6 represents a detail of an acoustic attenuation panel equipping the turbojet engine of FIG. 5 according to the present disclosure.

In the zone located between the fan 64 and the blades 66 of the straightener, the flow has a gyration angle γ. In order to better adapt the acoustic treatment in this area, as represented in FIG. 6, it is possible, in addition to the inclination of the acoustic apertures upstream of the propulsion unit by the drilling angle β, to introduce an inclination angle γ, in order to compensate for the gyration movement of the air flow, such that the axis of the acoustic apertures is locally always oriented in the direction of the flow.

Of course, the present disclosure is in no way limited to the forms described and represented.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An acoustic attenuation panel assembly for a propulsion unit including a nacelle and a turbojet engine, the assembly including a first attenuation panel and a second attenuation panel, each panel comprising:
   a cellular core disposed between an inner skin and an outer skin, the outer skin including a plurality of acoustic apertures, the plurality of acoustic apertures being inclined, at a non-zero inclination angle relative to a direction normal to the outer skin, upstream with respect to a flow direction of air or gas flow to which the acoustic attenuation panel is subjected to under normal operating conditions of the propulsion unit when said acoustic attenuation panel is mounted in the propulsion unit;
   wherein each of the plurality of acoustic apertures of the panel is inclined at a same non-zero inclination angle as each other of the plurality of acoustic apertures; and
   wherein the inclination angle of the apertures of the first attenuation panel is different than the inclination angle of the apertures of the second attenuation panel.

2. The acoustic attenuation panel assembly according to claim 1, wherein the inclination angle of the plurality of acoustic apertures is between 10° and 40°.

3. The acoustic attenuation panel assembly according to claim 1, wherein the inner and outer skins are made of organic matrix composite materials.

4. The acoustic attenuation panel assembly according to claim 1, wherein the plurality of acoustic apertures are made by mechanical drilling or by laser drilling.

5. An aircraft propulsion unit including a nacelle and an aircraft turbojet engine, the turbojet engine including a fan, the propulsion unit comprising at least one acoustic attenuation panel assembly according to claim 1.

6. The aircraft propulsion unit according to claim 5 further including a plurality of acoustic attenuation panels including different inclination angles.

7. The aircraft propulsion unit according to claim 6, wherein the inclination angles of the plurality of acoustic attenuation panels decreases from upstream to downstream of the nacelle when the plurality of acoustic attenuation panels are located upstream of the fan of the turbojet engine.

8. The aircraft propulsion unit according to claim 6, wherein the inclination angle of the plurality of acoustic attenuation panels increases when the plurality of acoustic attenuation panels are located downstream of the fan of the turbojet engine.

9. The aircraft propulsion unit according to claim 5, wherein the turbojet engine includes a fan casing surrounding the fan, wherein an inner surface of the fan casing includes at least one acoustic attenuation panel.

10. The aircraft propulsion unit according to claim 5, wherein the turbojet engine includes a straightener located downstream of the fan, the straightener including a plurality of blades, wherein an outer surface of the straightener blades includes at least one acoustic attenuation panel.

11. The aircraft propulsion unit according to claim 5, wherein the turbojet engine includes, downstream of the fan, a casing delimiting an inner surface of a secondary flow path and an outer surface of a primary flow path, wherein at least one of the inner surface of the secondary flow path and the outer surface of the primary flow path includes an acoustic attenuation panel.

\* \* \* \* \*